Feb. 19, 1963 O. M. TOENNIES 3,077,997
DEVICE FOR TRANSFERRING A CARCASS FROM
ONE CONVEYOR TO ANOTHER
Filed June 22, 1961 2 Sheets-Sheet 1

INVENTOR.
OWE M. TOENNIES
BY
Pearce and Schaeperklaus
Attorneys.

Feb. 19, 1963
O. M. TOENNIES
3,077,997
DEVICE FOR TRANSFERRING A CARCASS FROM
ONE CONVEYOR TO ANOTHER
Filed June 22, 1961
2 Sheets-Sheet 2
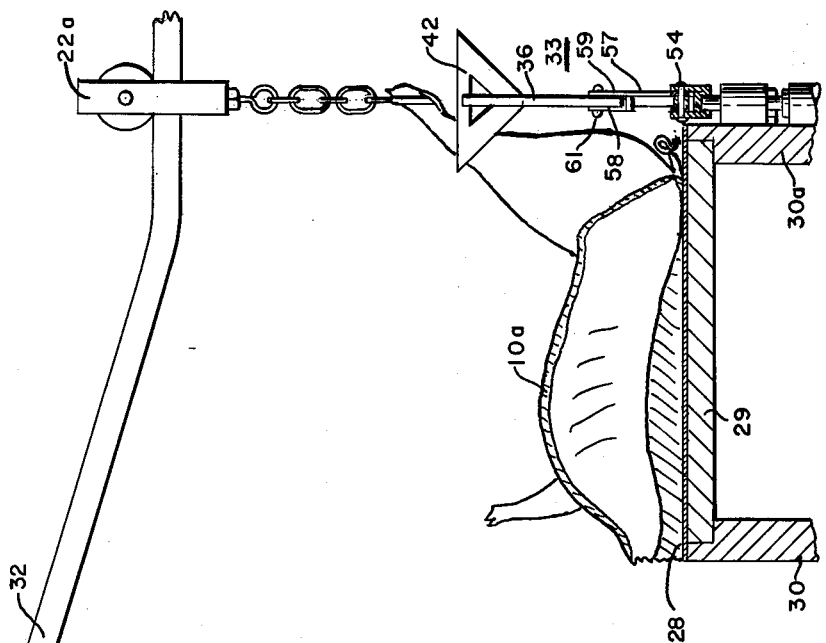
FIG. 2.
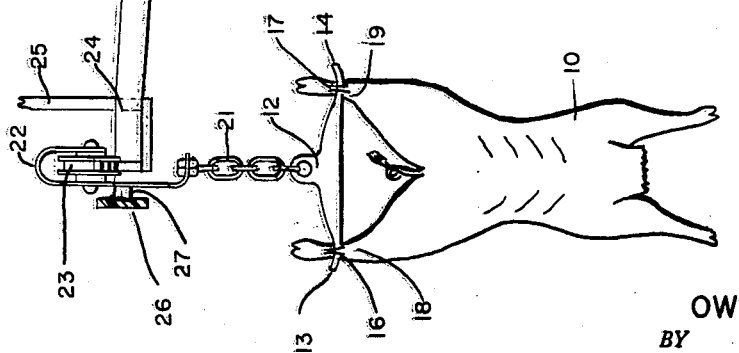
INVENTOR.
OWE M. TOENNIES
BY
Attorneys.

United States Patent Office

3,077,997
Patented Feb. 19, 1963

3,077,997
DEVICE FOR TRANSFERRING A CARCASS FROM ONE CONVEYOR TO ANOTHER
Owe M. Toennies, Cincinnati, Ohio, assignor to The Grove Research and Development Co., Cincinnati, Ohio, a corporation of Ohio
Filed June 22, 1961, Ser. No. 118,936
4 Claims. (Cl. 214—59)

This invention relates to meat handling devices. More particularly, this invention relates to a device for transferring an animal carcass from one conveyor to another.

In early stages of preparation, an animal carcass is suspended from a rail and travels in suspended position. In subsequent stages, the carcass is transported on a belt type conveyor. An object of this invention is to provide a device for transferring a carcass from a rail conveyor to a belt conveyor expeditiously and without injury to the carcass.

When the carcass is supported on the rail conveyor, it is carried by a gambrel hook. A further object of this invention is to provide a device which quickly and positively releases the carcass from a gambrel hook.

A further object of this invention is to provide a device which engages the legs of the carcass and moves the legs outwardly to release the legs from the gambrel hook as the carcass is being laid on the belt conveyor.

A further object of this invention is to provide a device which lays the carcass on the belt conveyor and, at the same time, moves the legs thereof outwardly to release the carcass from the gambrel hook.

The above and other objects and features of the invention will be apparent to those skilled in the art to which this invention pertains from the following detailed description and the drawings, in which:

FIG. 2 is an enlarged view of section taken on the line 2—2 in FIG. 1, a second carcass being shown in suspended position;

In the following detailed description and the drawings, like reference characters indicate like parts.

Figure 1:
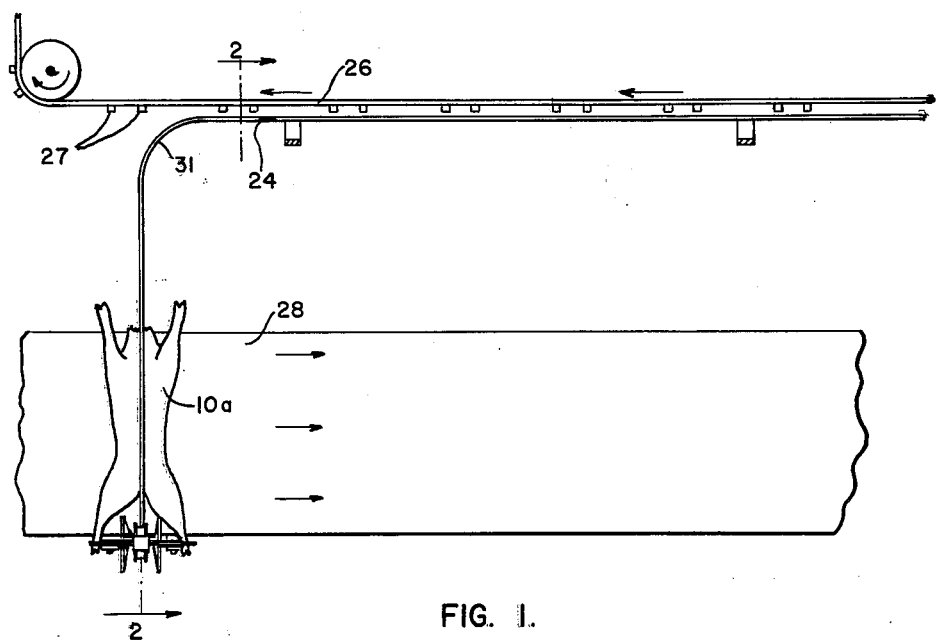
FIG. 1 is a plan view of a device for transferring an animal carcass from one conveyor to another constructed in accordance with an embodiment of this invention, rail supports thereof being partly broken away, a carcass being shown in position for release from the first conveyor.

In FIG. 2, an animal carcass 10 is shown supported on a gambrel hook 12 having outwardly extending ends 13 and 14. The hook ends 13 and 14 can extend inside tendons 16 and 17 of legs 18 and 19, respectively, of the carcass to support the legs in spaced relation. The gambrel hook is suspended on a chain 21. The chain 21, in turn, is supported by a carriage 22 of inverted J-shape. A grooved wheel 23 is rotatably mounted in the carriage 22. The wheel 23 runs on a monorail track 24 supported by appropriate hanger supports 25. The hanger supports can be supported from above in an appropriate manner (not shown). An appropriate drive belt 26 adjacent and moving parallel to the track 24 is provided with lugs 27 which can engage the carriage to advance the carriage and carcass along the track 24. The belt moves in the direction of the arrows thereon in FIG. 1.

Initial stages of preparation of the carcass and removal of internal organs are carried on while the carcass is suspended in the manner shown in the left hand portion of FIG. 2. The carcass is then transferred to a horizontal moving belt conveyor 28 for further processing. The belt conveyor 28 moves in the direction of the arrows thereon in FIG. 1. An appropriate supporting table 29 underlies and supports the belt conveyor 28. Support frames 30 and 30a support the table 29.

As shown in FIG. 1 the track 24 turns as indicated at 31 releasing the carriage 22 from the drive belt 26. The track 24 slopes downwardly, as indicated at 32 (FIG. 2) from the turn 31 and above the belt conveyor 28 so that the carcass moves downwardly to be laid on the belt conveyor 28 as indicated at 10a with carriage 22a overlying a leg releasing assembly indicated generally at 33, which is at a leg releasing station on the belt conveyor 28.

Figures 3, 4, 5:
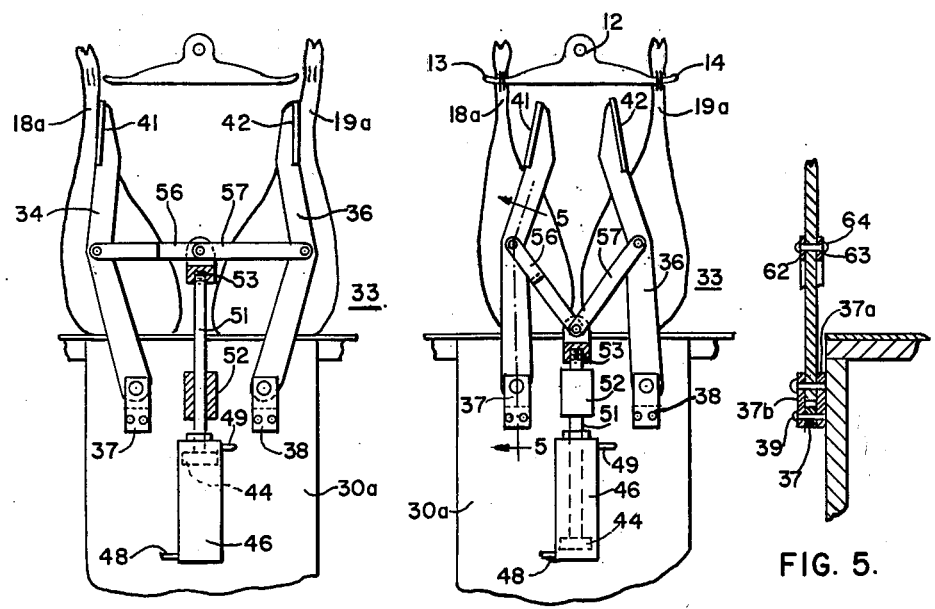
FIG. 3 is a fragmentary view in side elevation of an assembly portion of the device which engages carcass legs to release the legs, the leg releasing portion being shown in a normal position.
FIG. 4 is a fragmentary view in side elevation showing the leg releasing assembly of FIG. 3 in leg engaging position.
FIG. 5 is a view in section taken on the line 5—5 in FIG. 3.

As shown in FIGS. 3 and 4, the leg releasing assembly 33 includes two actuator arms 34 and 36 which are pivotally mounted in yoke members 37 and 38 respectively. The yoke members 37 and 38, in turn, are mounted on the frame member 30a. As shown on FIG. 5, yoke member 37 includes an inner member 37a of generally angle shape, which is attached to the frame member 30a as by welding. An outer plate 37b is attached to the inner member 37a by screws 39. The yoke member 38 can be of similar construction. Upper ends of the arms 34 and 36 carry inverted, generally triangular heads 41 and 42 respectively which are adapted to engage the legs 18a and 19a, respectively, of the carcass 10a when the arms 34 and 36 move from the FIG. 3 position to the FIG. 4 position.

As shown in FIGS. 3, 4, and 5, the arms 34 and 36 are actuated by a piston 44 (FIG. 3) mounted inside a cylinder 46. The cylinder 46 is attached to the frame member 39 in an appropriate manner, as by welding, or the like.

Fluid under pressure, such as compressed air, introduced into the cylinder 46 through a lead 48 drives the piston 44 upwardly from the FIG. 3 position to the FIG. 4 position. Similarly, fluid under pressure introduced to the cylinder 46 through a lead 49 drives the piston 44 downwardly from the FIG. 4 position to the FIG. 3 position. A piston rod 51 is attached to the piston 44 and reciprocates up and down inside a bearing sleeve member 52. The bearing sleeve member 52 is attached to the frame 30a (as by welding). At the upper end of the piston rod 51 is mounted a clevis 53. The clevis 53 carries a clevis pin 54 (FIG. 2) in which lower or inner ends of links 56 and 57 are pivotally mounted. The outer end of the link 57 includes jaws 58 and 59 which carry a pivot pin 61. The pivot pin 61 extends through the actuator arm 36 spaced from ends thereof to pivotally connect to the outer end of the link 57 to the arm 36. Similarly the outer end of the link 56 includes jaws 62 and 63 (FIG. 5) which carry a pivot pin 64. The pivot pin 64 extends through the actuator arm 34 spaced from the ends thereof. When the piston 44 is raised from the FIG. 3 position to the FIG. 4 position, the arms 34 and 36 are swung outwardly by action of the links, 56 and 57 as shown in FIGS. 3 and 4. When the carcass moves from the position shown at 10 (FIG. 2) to the position indicated at 10a, the legs 18a and 19a (FIGS. 3 and 4) move to a position on opposite side of the trapezoidal heads 41 and 42 of the actuator arms. Then, fluid under pressure is introduced into the cylinder 46 through the lead 48 to cause the actuator arms 36 and 37 to swing outwardly bringing the heads 41 and 42 against the legs 18a and 19a to release the legs. The carcass then moves away from the leg releasing assembly on the conveyor belt 38 in the direction of the arrows in FIG. 1 on the belt for further processing.

The device illustrated in the drawings and described above is subject to structural modification without departing from the spirit and scope of the appended claims.

Having described my invention, what I claim is new and desire to secure by Letters Patent is:

1. Apparatus for handling a carcass which comprises a rail conveyor, a carriage supported on said rail conveyor, means for suspending a gambrel hook from said carriage with legs of the carcass supported on said gambrel hook in spaced relation, said rail including a downwardly sloping section, a horizontal conveyor mounted below said sloping section, the carcass being laid on the horizontal conveyor as the carriage progresses down said sloping section to a leg releasing station, and a leg releasing assembly mounted adjacent the conveyor belt at the leg releasing station, said leg releasing assembly including a pair of actuator arms pivotally mounted adjacent the conveyor belt and extending upwardly beneath the downwardly sloping section for swinging in an upright plane transversely of the downwardly sloping section, heads mounted on upper ends of the actuator arms and engageable with inner sides of the legs of the carcass when the carcass is at the leg releasing station, and means for swinging the actuator arms outwardly to release the legs from the gambrel hook, the belt conveyor removing the carcass from the leg releasing station.

2. Apparatus for handling a carcass which comprises a rail conveyor, a carriage supported on said rail conveyor, means for suspending a gambrel hook from said carriage with legs of the carcass supported on said gambrel hook in spaced relation, a horizontal conveyor belt below a section of said rail, there being a leg releasing station where the rail conveyor overlies the conveyor belt, and a leg releasing assembly mounted adjacent the conveyor belt at the leg releasing station, said leg releasing assembly including a pair of actuator arms pivotally mounted adjacent the conveyor belt and extending upwardly beneath the rail conveyor for swinging in an upright plane transversely of the rail conveyor, heads mounted on upper ends of the actuator arms and engageable with inner sides of the legs of the carcass when the carcass is at the leg releasing station, and means for swinging the actuator arms outwardly to release the legs from the gambrel hook, the belt conveyor removing the carcass from the leg releasing station.

3. Apparatus for handling a carcass which comprises a rail conveyor, a carriage supported on said rail conveyor, means for suspending a gambrel hook from said carriage with legs of the carcass supported on said gambrel hook in spaced relation, said rail including a downwardly sloping section, a horizontal conveyor mounted below said sloping section, the carcass being laid on the horizontal conveyor as the carriage progresses down said sloping section to a leg releasing station, and a leg releasing assembly mounted adjacent the conveyor belt at the leg releasing station, said leg releasing assembly including a pair of actuator arms pivotally mounted adjacent the conveyor belt and extending upwardly beneath the downwardly sloping section, a main pivot for each actuator arm pivotally mounting the arm for swinging in an upright plane transversely of the downwardly sloping section, heads mounted on upper ends of the actuator arms and engageable with inner sides of the legs of the carcass when the carcass is at the leg releasing station, a link member pivotally attached to each actuator arm spaced from the main pivot, a clevis pin pivotally linking the link members, and means for moving the clevis pin for swinging the actuator arms outwardly to release the legs from the gambrel hook, the belt conveyor removing the carcass from the leg releasing station.

4. Apparatus for handling a carcass which comprises a rail conveyor, a carriage supported on said rail conveyor, means for suspending a gambrel hook from said carriage with legs of the carcass supported on said gambrel hook in spaced relation, said rail including a downwardly sloping section, a horizontal conveyor mounted below said sloping section, the carcass being laid on the horizontal conveyor as the carriage progresses down said sloping section to a leg releasing station, and a leg releasing assembly mounted adjacent the conveyor belt at the leg releasing station, said leg releasing assembly including a pair of actuator arms pivotally mounted adjacent the conveyor belt and extending upwardly beneath the rail conveyor, a main pivot for each actuator arm pivotally mounting the arm for swinging in an upright plane transversely of the rail conveyor, heads mounted on upper ends of the actuator arms and engageable with inner sides of the legs of the carcass when the carcass is at the leg releasing station, a link member pivotally attached to each actuator arm spaced from the main pivot, a clevis pivotally linking the link members, the clevis carrying a clevis pin, a piston rod attached to the clevis, a piston mounted on said piston rod, a cylinder in which the piston reciprocates, and means for introducing fluid under pressure into said cylinder for swinging the actuator arms outwardly to release the legs from the gambrel hook, the belt conveyor removing the carcass from the leg releasing station.

No references cited.